June 10, 1930.　　　　　R. S. KIRK　　　　　1,763,589
TIRE FORMING MACHINE
Filed Nov. 18, 1927　　　3 Sheets-Sheet 2
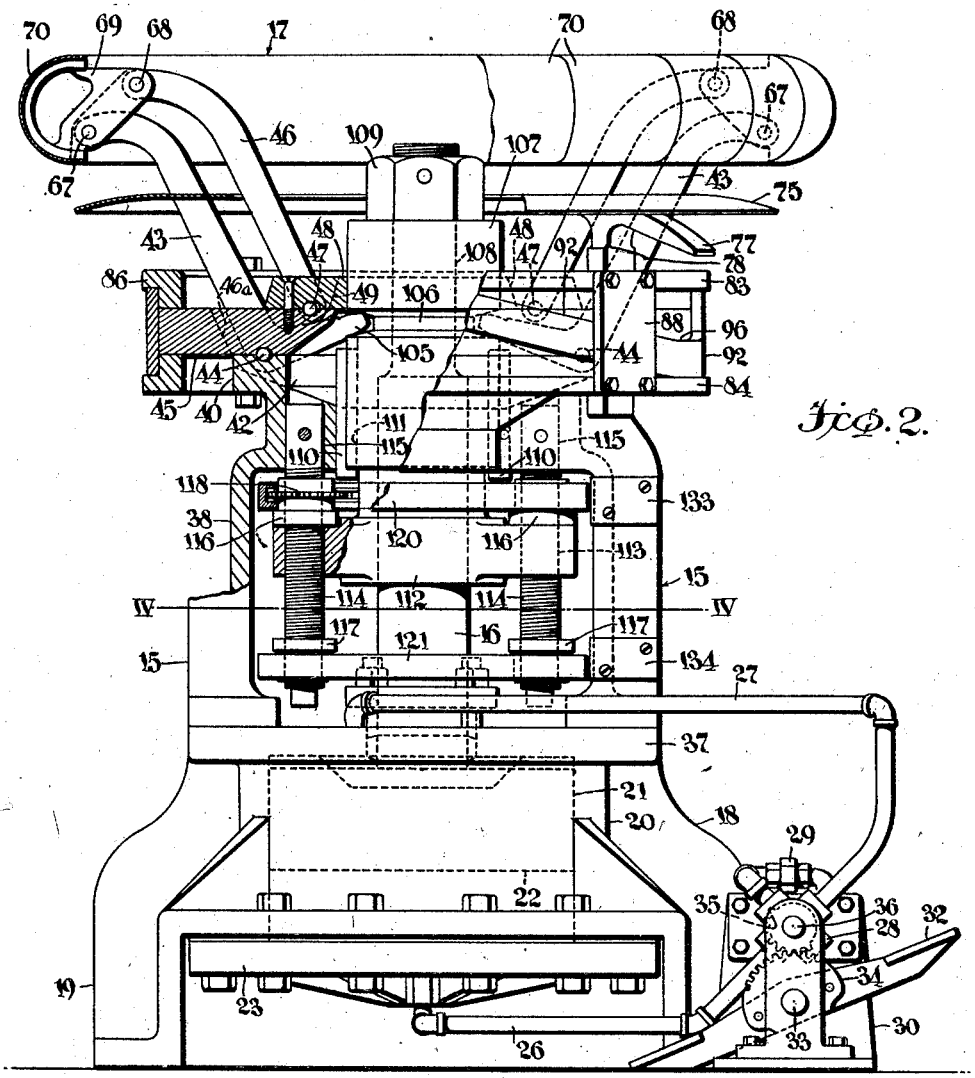
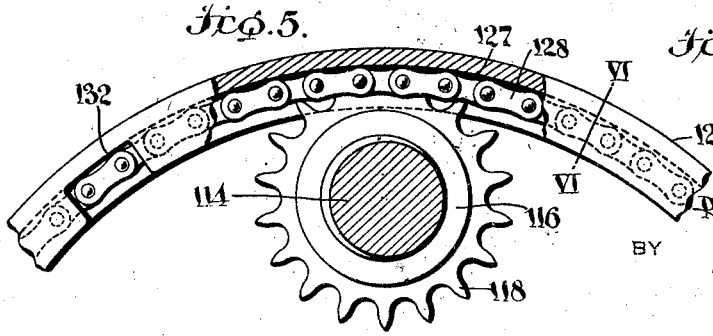
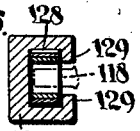
INVENTOR
Raphael S. Kirk,
BY
ATTORNEY June 10, 1930.  R. S. KIRK  1,763,589
TIRE FORMING MACHINE
Filed Nov. 18, 1927   3 Sheets-Sheet 3

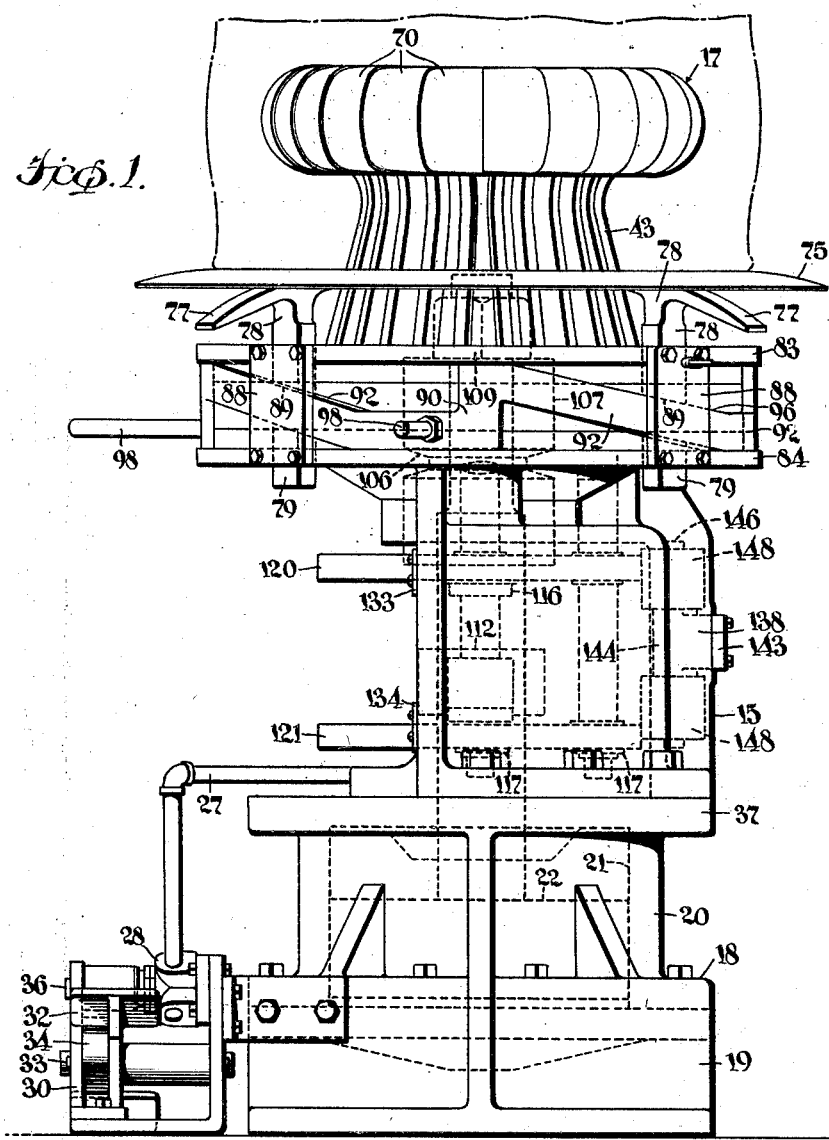

INVENTOR
Raphael S. Kirk,
ATTORNEY

Patented June 10, 1930

1,763,589

UNITED STATES PATENT OFFICE

RAPHAEL S. KIRK, OF AKRON, OHIO, ASSIGNOR TO THE GOODYEAR TIRE & RUBBER COMPANY, OF AKRON, OHIO, A CORPORATION OF OHIO

TIRE-FORMING MACHINE

Application filed November 18, 1927. Serial No. 234,130.

My invention relates to apparatus for manufacturing pneumatic tire casings and it has particular relation to a mechanism for expanding and shaping the tread portions of so-called "flat built" or "drum built" tire casings.

One object of my invention is to provide a machine for the purpose specified, which is simple in operation and in which access to the tire supporting and manipulating elements is not obstructed by other structural elements.

Another object of my invention is to provide an improved mechanism for actuating the sections of the expanding core of a tire shaping machine.

An additional object of the invention lies in the provision of an improved means for aligning the central portion of the tread bend with respect to the center line of the periphery of the expanding core of a tread shaping machine.

One method of constructing tires is known as the "drum" or "flat built" method. In this process, the various plies of fabric, the beads and the tread portion are formed into a cylindrical or so-called endless "flat band" and this band is then expanded into a toroidal shape, such as that assumed by the finished tire. The devices heretofore employed to shape the tread bands have not been entirely satisfactory because they were cumbersome to operate and frequently did not apply a uniform expanding pressure against the inner walls of the tire casing.

A machine constructed in accordance with the provisions of my invention is designed to obviate these disadvantages.

For a better understanding of the invention, reference may now be had to the accompanying drawings, forming a part of the specification, in which:

Fig. 1 is a side elevational view of a machine embodying my invention, showing the core in its collapsed position;

Fig. 2 is a front view of the machine partially in elevation and partially in cross-section, disclosing the interior mechanism thereof;

Figures 3, 4:
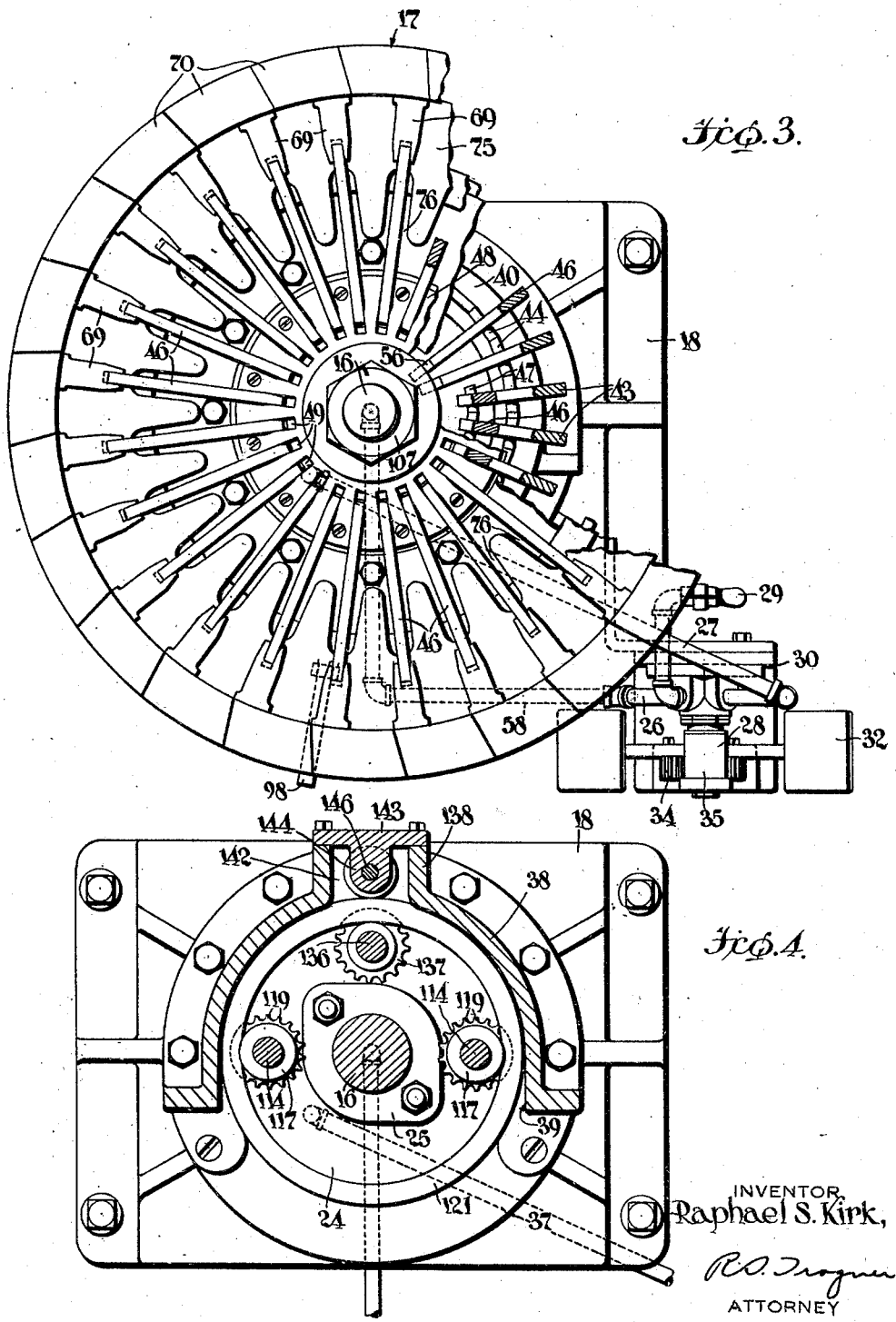

Fig. 3 is a plan view of the machine showing the arrangement of the core sections and the various core supporting links;

Fig. 4 is a cross-sectional view, taken substantially along the line IV—IV of Fig. 2;

Fig. 5 is a cross-sectional view, on a larger scale, showing in detail the construction of an annular gear employed for operating certain elements of the machine;

Fig. 6 is a cross-sectional view showing in detail the construction disclosed in Fig. 5, the view being taken substantially along the line VI—VI thereof; and Fig. 7 is a perspective view showing in detail certain parts of the centering mechanism of the expanding machine.

In practising my invention, I provide a housing indicated generally by the numeral 15 and a piston rod 16, that is adapted to operate an expandible core mechanism 17 of the machine. The housing 15 is composed of a base section 18 having legs 19 on either side thereof, and a tubular or cylindrical portion 20, that contains a piston chamber 21. A piston head 22 slidably mounted in the chamber 21 is rigidly secured to the piston rod 16. The ends of the piston chamber are closed by a lower cylinder head 23 and an upper cylinder head 24, the latter of which is provided with a piston gland 25 that fits closely around the piston rod 16, to retain compression fluid in the chamber. The cylinder heads 23 and 24 are provided with respective compression fluid conduits 26 and 27 whereby compression fluid is admitted to the cylinder in order to actuate the piston head 22.

The outer ends of the conduits 26 and 27 are attached to a three way valve 28 that is connected to a compression fluid main 29. The valve mechanism is mounted upon a pedestal 30 and a valve actuating treadle 32 is pivoted intermediate its length to the pedestal by means of a stud shaft 33. A segmental gear 34 rigidly secured to the mid portion of the treadle actuates a small gear 35 that is secured upon a stem 36 of the valve 28.

The pedestal 18 has a flange 37 upon its upper portion, to which is secured an arcuate housing section 38. The latter is provided with an open front, indicated at 39, whereby access to the piston mechanism within the housing is facilitated. A flange 40 at the upper end of the housing has a series of radially arranged slots 42 formed therein, in which the apices of bell crank levers 43 are journalled by means of pins 44 that are secured in the flange.

The pins are confined in the upper end of the housing 38 by means of a circular cover plate 45 that has slots 46ª which register with the slots 42 in order to receive the lower portions of the bell crank levers 43. A plurality of radially disposed links 46 are supported upon pins 47 that are secured in the upper face of the plate 45 and are arranged in a circle concentrically of the piston rod 16. A second cover plate 48 bolted to the plate 45 cooperates with the latter to secure the pins 47 in their proper position. A plurality of radially arranged slots 49 serve to guide the links 46 radially as they pivot upon the pins 47. The outer ends of the bell crank lever 43 and the links 46 are respectively pivoted, as indicated at 67 and 68, upon brackets 69 that support telescoping arcuate shells 70 forming the expanding core 17 of the machine.

A tire supporting annular disc 75, having radially arranged slots 76 about its inner periphery for the reception of the bell crank levers 43 and the links 46, is arranged for vertical adjustment upon the heads 77 of T-shaped members 78. Downwardly extending shanks 79 of the members 78 are slidably supported upon rings 83 and 84 that are arranged respectively about the upper and lower edges of the plate 45 and are provided with flanged portions 86 having slots 87 therein for slidably guiding the shanks 79. The slots 87 are closed by means of plates 88 that are bolted to and connect the rings together. These plates also serve slidably to confine the shanks of the T-shaped members within the slots 87. The shanks of the T-shaped members are notched, as indicated at 89, to receive a ring 90 having inclined or helical portions 92 that serve as cams.

The ring 90 is also provided with radially projecting arms or handles 98 whereby it may be rotated to elevate the disc 75.

The bell cranks 43 have inwardly projecting arms 105 at their lower ends which extend into an annular channel 106 formed in a massive collar 107, which is rigidly secured upon a reduced shank portion 108 of the piston rod 16 by means of a nut 109 screw-threaded thereon. Guiding keys 110 rigidly secured in the housing 38 are disposed in vertical keyways 111 that are formed in the collar 107.

A stop mechanism for limiting the length of the stroke of the piston is provided in the arcuate housing portion 38 and comprises a collar 112 rigidly mounted upon the piston rod 16. The collar has formed therein openings 113 which loosely surround vertically disposed rods 114 rigidly secured in openings 115 in the upper portion of the housing 38. The rods are screw threaded to receive upper and lower nuts 116 and 117 that are disposed in the path of travel of the collar 112. The nuts are provided with sprocket teeth 118 and 119 respectively, that are actuated by annular members 120 and 121, serving as gears, each of which has a channel 127 formed about its inner periphery and a sprocket chain 128 disposed therein. The chain is confined within the channel by means of the flanges 129 that are integral with the outer edges thereof.

The sprocket chain 128 is inserted into the channel through an opening 132 formed in the side. Upper and lower plates 133 and 134 are secured to the front edge of the housing 38 in such position as to serve as indicators for the rings 120 and 121, whereby the proper position of the nuts 116 and 117 upon the rods 114 may be determined. A vertical shaft 136, having a nut 137 similar to the nuts 116 and 117, is disposed at the rear of the housing in parallel relation with respect to the shafts 114 and in such position as to engage the inner periphery of the annular members 120 and 121, thereby preventing forward displacement of the latter members. The rear side of the housing member 38 is provided with a flanged portion 138 defining an opening 142.

A plate 143 having an inwardly projecting lug 144, is bolted upon the flanges 138 and is provided with a vertically disposed shaft 146. The latter member is provided with rollers 148 that engage the outer peripheries of the annular members 120 and 121 and thereby hold the latter member in close engagement with the nuts 137.

In operating my machine, a tire band or carcass 150 is positioned about the core 17 which is collapsed by telescoping the shells 70 as shown by Fig. 1. The tire band is supported upon the disc 75 and the height of the latter is adjusted by rotating the ring 90 until the center line of the tire band is juxtaposed to the center line of the tire expanding core 17. The treadle 32 is then so operated as to admit compressed fluid to the lower end of the chamber 21, thereby causing the piston head 22 to be actuated upwardly. The upward thrust of the piston head causes the arms 105 to be rotated about the pivot 44 and thereby moving the core sections 70 outwardly against the inner periphery of the tire band.

The outward expansion of the sections thus causes the tread portion of the tire to be shaped to the contour that it assumes in the finished tire. The air valve 28 is then operated to release the compressed fluid in the lower part of the chamber and to admit fluid to the upper portion of the latter whereby the piston rod 16 is returned to its original position so that the newly shaped tire may be removed from the table 75. The device is then in condition for a repetition of the cycle of operation.

In the event it is desired to shape various sizes of tires upon the machine, it is necessary to adjust the limits of movement of the core sections in order that the tire band may not be expanded excessively or insufficiently. The adjustment is accomplished by so rotating the rings 120 and 121 as to cause the nuts 116, 117 and 137 to travel upwardly or downwardly upon the screw threaded shafts 114 and 136. By this means the limits of travel of the collar 112 are determined and the movement of the expansible core sections is properly regulated.

From the foregoing description, it will be apparent that I have provided a tire expanding mechanism that is relatively simple in operation. The device has no parts that project above the tire core and accordingly there are no obstructions in placing the tire bands upon the core. It will be observed that the bell cranks 43 and the links 46 rotate through a relatively short arc, and since the pressure exerted upon the one side of the tire band is proportional to the sine of the arc of movement of the bell cranks and the levers, it will be apparent that the pressure exerted is practically uniform throughout the expansive movement of the core sections. The tire supporting table is so arranged as to be conveniently adjustable to receive various sizes of tire bands which it may be desired to shape upon the machine by merely rotating the ring 90.

Although I have illustrated only one form which my invention may assume and have described in detail but a single application thereof, it will be apparent to those skilled in the art that the invention is not so limited but that various modifications may be made therein without departing from the spirit of the invention or from the scope of the appended claims.

What I claim is:

1. A tire shaping machine comprising a horizontally disposed core composed of sections, a pair of parallel links pivoted to each section, means for pivotally supporting the links and means disposed substantially entirely below the plane of the core sections for applying force to the links to cause them to move the sections radially from a common center.

2. A tire shaping machine comprising a core composed of sections, pairs of parallel links pivoted to the sections, means for pivotally supporting the links, one of each of said pairs of links having a projecting arm rigidly secured thereto, and means for applying force to each arm for operating the links.

3. A tire shaping machine comprising a core composed of sections, pairs of parallel links pivoted to the sections, means for pivotally supporting the links, one of each of said pairs of links having an inwardly projecting arm rigidly secured thereto, and means for applying force to the arms for operating the links including a piston rod having means to engage each arm.

4. A tire shaping machine comprising a core composed of sections, pairs of radially swingable parallel links pivoted to the sections, means for pivotally supporting the links, one of each of said pairs of links having an inwardly projecting arm, and means for applying force to the arms for operating the links, the means including a piston rod having a groove in which the free ends of the arms engage for operative movement.

5. A tire shaping machine comprising a core composed of sections, pairs of parallel links pivoted to the sections, means for pivotally supporting the links for swinging movement in radially disposed planes, one of each of said pairs of links having an inwardly projecting arm, means for applying force to the arms for operating the links, the means including a piston rod having an annular groove in which the free ends of the arms engage for operative movement, and a piston head secured to the piston rod and operable by fluid pressure in a compression cylinder.

6. A tire shaping machine comprising a core composed of sections, pairs of parallel links pivoted to the sections, means for pivotally supporting the links, one of each of said pairs of links having a projecting arm, means for applying force to the arms for operating the links, the means including a piston rod having means to engage each arm, a collar on the piston rod and stop means adapted to engage the collar to limit the piston stroke.

7. A tire shaping machine comprising a core composed of sections, pairs of parallel links pivoted to the sections, means for pivotally supporting the links, one of each of said pairs of links having a projecting arm, means for applying force to the arms for operating the links, and adjustable supports secured below the core sections in position properly to center the tires with respect to the core sections.

8. A tire shaping machine comprising a tire core composed of sections, parallel links for supporting and moving the core sections radially, a plurality of tire supports arranged below the core, a ring having cam surfaces engaging each support and adapted simultaneously to move the supports toward or away from the core.

9. A tire shaping machine comprising a tire core composed of sections, sets of parallel links arranged in a circle for supporting the sections, a piston for operating the links, one of each pair of links having a rigidly attached arm engaging the piston, adjustable tire supports secured below the core and adapted to center the tread of the tire band with respect to the core, a collar on the piston, and adjustable stops secured in the path of the collar and adapted to limit the movement of the piston.

10. A tire shaping machine including a compression cylinder, a piston head operable in the cylinder, a piston rod rigidly secured to the piston head, a collar secured to the piston, rigid rods extending through openings in the collar and stops secured adjustably to the rod members to limit the movements of the collar and piston rod.

11. A tire shaping machine including a compression cylinder, a piston head operable in the cylinder, a piston rod secured rigidly to the piston head, a collar having openings therein secured rigidly to the piston rod, rods secured to a rigid portion of the machine and extending through the openings in the collar, and screw-threaded nuts movable longitudinally upon the rods for limiting the movement of the collar and piston rod.

12. A tire shaping machine including a compression cylinder, a piston head operable in the cylinder, a piston rod secured rigidly to the piston head, a collar having openings therein secured rigidly to the piston rod, rods secured to a rigid portion of the machine and extending through the openings in the collar, screw-threaded nuts movable longitudinally upon the rods for limiting the movement of the collar and piston rod, and means for simultaneously operating the nuts.

13. A tire shaping machine including a compresion cylinder, a piston head operable in the cylinder, a piston rod secured rigidly to the piston head, a collar having openings therein rigidly secured to the piston rod, rods secured to a rigid portion of the machine and extending through the openings in the collar, screw-threaded nuts movable longitudinally upon the rods for limiting the movement of the collar and piston rod, and means for simultaneously operating the nuts, said means comprising an annular gear member engaging the nuts.

In witness whereof, I have hereunto signed my name.

Signed at Akron, in the county of Summit, and State of Ohio, this 17th day of November, 1927.

RAPHAEL S. KIRK.